United States Patent [19]

Murata et al.

[11] Patent Number: 4,737,481

[45] Date of Patent: Apr. 12, 1988

[54] PROCESS FOR PRODUCING CATALYST INGREDIENT FOR USE IN OLEFIN POLYMERIZATION

[75] Inventors: Masahide Murata; Hiroyuki Furuhashi; Masafumi Imai; Hiroshi Ueno, all of Saitama, Japan

[73] Assignee: Toa Nenryo Kogyo Kabushiki Kaisha, Tokyo, Japan

[21] Appl. No.: 944,103

[22] Filed: Dec. 17, 1986

[30] Foreign Application Priority Data

Dec. 20, 1985 [JP] Japan .................................. 60-285808

[51] Int. Cl.$^4$ ................................................ C08F 4/64
[52] U.S. Cl. ...................................... 502/119; 502/121; 502/122; 502/123; 502/124; 502/125; 502/126; 502/127; 526/124
[58] Field of Search ............... 502/119, 121, 122, 123, 502/124, 125, 126, 127

[56] References Cited

U.S. PATENT DOCUMENTS

| | | | |
|---|---|---|---|
| 3,135,809 | 6/1964 | Bosmajian | 502/103 X |
| 4,551,440 | 11/1985 | Imai et al. | 502/119 |
| 4,552,858 | 11/1985 | Imai et al. | 502/119 X |
| 4,565,798 | 1/1986 | Yamamoto et al. | 502/119 |
| 47,550,095 | 10/1985 | Imai et al. | 502/119 |

Primary Examiner—Patrick P. Garvin, Sr.
Attorney, Agent, or Firm—M. B. Kurtzman

[57] ABSTRACT

A process for producing catalyst ingredient for use in olefin polymerization which comprises contacting (A) a magnesium hydrocarbyloxide and (B) a silicon compound having hydrogen-silicon bonds in the presence of a hydrocarbon medium, contacting the thus obtained solid product (C) a halogenated titanium compound in the presence or absence of a hydrocarbon medium and then adding to contact (D) an electron donating compound.

6 Claims, 1 Drawing Sheet

PROCESS FOR PRODUCING CATALYST INGREDIENT FOR USE IN OLEFIN POLYMERIZATION

BACKGROUND OF THE INVENTION

1. Field of the Invention

This invention concerns a process for producing a catalyst ingredient with uniform particle configuration for use in polymerization of olefins, particularly, $\alpha$-olefins such as propylene.

2. Prior Art

Several attempts have been tried for the process of preparing solid catalyst ingredients comprising magnesium, titanium, halogen atoms and electron donating compounds as essential ingredients for use in polymerization of olefins, particularly, $\alpha$-olefins having three or more carbon atoms, and they exhibit rather preferable catalyst performance with respect to the stereoregularity, catalytic activity and the bulk density of the obtained polymers.

For instance, a catalyst ingredient prepared by contacting a magnesium compound, an electron donating compound, a silicon compound having Si—H bonds and a titanium halide compound is proposed (Japanese Patent Laid-Open No. Sho 57-92009). However, the proposed magnesium compound is actually a magnesium halide compound, the silicon compound and titanium halide compound are simultaneously brought into contact upon use and their catalytic performance is not satisfactory.

The present inventors previously developed a catalyst ingredient prepared by contacting a magnesium alkoxide, a silicon compound having hydrogen-silicon bonds, an electron donating compound and a titanium compound capable of producing an olefin polymer having a high stereoregularity and high bulk density at high yield (U.S. Ser. No. 481,197, filed Apr. 1, 1983 and now abandoned), as well as a process for polymerizing olefins by using a catalyst in which the catalyst ingredient described above is combined with a specific cocatalyst system (U.S. Pat. No. 4,565,798). However, the catalyst ingredient developed by the present inventors was prepared by contacting the above-mentioned four ingredients substantially in the above-mentioned order, that is, contacting the magnesium alkoxide with the silicon compound having the hydrogen-silicon bonds, thereafter, contacting them with the electron donating compound and further with the titanium compound. It has been found that macro-polyolefin particles of greater than 1 mm diameter are formed in a rather great amount in a case where the olefin is polymerized by using the catalyst ingredient obtained in such a contacting method.

PROBLEMS TO BE SOLVED BY THE INVENTION

If a great amount of macro particles are produced during the polymerization of an olefin, it particularly causes cloggings in polymerization vessels, pipeways, and the like, thereby bringing about various troubles in the operation of the apparatus.

The present inventors have made an earnest study with an aim of providing a catalyst ingredient capable of suppressing the formation of macro-particles while maintaining the high stereoregularity and high catalytic activity of the catalyst ingredient as they are and, as a result, have accomplished this invention based on the finding that the object of this invention can be attained by specifying the method and the order of contacting the four ingredients as described above.

MEANS OF SOLUTION OF THE PROBLEMS

Feature of the Invention

Specifically, the feature of this invention resides in a process for producing a catalyst ingredient for use in polymerization of an olefin, which comprises contacting (A) a magnesium hydrocarbyloxide and (B) a silicon compound having hydrogen-silicon bonds in the presence of a hydrocarbon medium, contacting the thus obtained solid product with (C) a titanium halide compound in the presence or absence of a hydrocarbon medium and then adding to contact (D) an electron donating compound.

Starting Material for the Preparation of the Catalyst Ingredient

Description will be made to each of the starting materials used upon preparing the catalyst ingredient for use in this invention.

(A) Magnesium hydrocarbyloxide

The magnesium hydrocarbyloxide used in this invention is represented by the general formula: Mg(OR)(OR'). In the formula, R and R' represent alkyl, alkenyl, cycloalkyl, aryl or aralkyl of 1 to 20, desirably, 1 to 10 carbon atoms. R and R' may be identical or different from each other.

Examples of these compounds are:
$Mg(OCH_3)_2$, $Mg(OC_2H_5)_2$, $Mg(OCH_3)(OC_2H_5)$, $Mg(Oi-C_3H_7)_2$, $Mg(OC_3H_7)_2$, $Mg(OC_4H_9)_2$, $Mg(Oi-C_4H_9)_2$, $Mg(OC_4H_9)(Oi-C_4H_9)$, $Mg(OC_4H_9)(O_{sec}-C_4H_9)$, $Mg(OC_6H_{13})_2$, $Mg(OC_8H_{17})_2$, $Mg(OC_6H_{11})_2$, $Mg(OC_6H_5)_2$, $Mg(OC_6H_4CH_3)_2$, $Mg(OCH_2C_6H_5)_2$.

These magnesium dialkoxides are desirably dried upon use and, particularly, dried by heating under a reduced pressure. Further, as these magnesium dialkoxides, those commercially available products or those synthesized in known manners may be used. The magnesium dialkoxides may be pulverized into fine powder before use.

Further, it is also possible to use the magnesium dialkoxides while previously contacting it with an organic or inorganic inert solid substance. The contacting method can include, for example, mechanically copulverizing them in the presence or absence of an inert medium, in addition to a method of merely mixing them.

As the inorganic solid substance, metal compounds such as sulfate, hydroxide, carbonate, phosphate and silicate are suitable and, for example, $Mg(OH)_2$, $BaCO_3$ and $Ca_3(PO_4)_2$ may be mentioned.

The organic solid substance can include those low molecular compounds such as aromatic hydrocarbons; for example, durene, anthrathene, naphthalene and diphenyl. Further, there may also be used high molecular weight compounds such as polyethylene, polypropylene, polyvinyl toluene, polystyrene, polymethyl methacrylate, polyamide, polyester and polyvinyl chloride.

(B) Silicon Compound

The silicon compound used in this invention may be any of compounds having hydrogen-silicon bonds and those compounds represented by the general formula: $H_mR_nSiX_r$ are particularly mentioned. In the formula, R represents (1) hydrocarbon group, (2) $R^1O-$, wherein $R^1$ represents hydrocarbon group, (3) $R^2R^3N-$ ($R^2$, $R^3$ represent hydrocarbon group), (4) $R^4COO-$, wherein $R^4$ represents hydrogen atom or hydrocarbon group, and the like. X represents halogen atom, m represents a number from 1 to 3, $0 \leq r \leq 3$, $m+n+r=4$, respectively. Further, if n exceeds 1, R may be identical or different from each other.

As the hydrocarbon groups represented by R, $R^1$, $R^2$, $R^3$ and $R^4$, there can be mentioned alkyl, alkenyl, cycloalkyl, aryl and aralkyl with 1 to 16 carbon atoms. The alkyl can include methyl, ethyl, propyl, n-butyl, isobutyl, n-hexyl, n-octyl, 2-ethylhexyl and n-decyl; the alkenyl can include vinyl, allyl, isopropenyl, propenyl and butenyl; the cycloalkyl can include cyclopentyl and cyclohexyl; the aryl can include phenyl, tolyl, xylyl; and the aralkyl can include benzyl, phenetyl, phenylpropyl.

Among them, lower alkyl such as methyl, ethyl, propyl, isopropyl, n-butyl, isobutyl and t-butyl, as well as aryl such as phenyl and tolyl are desired.

X is a halogen atom such as chlorine, bromine and iodine, chlorine atom being desirable.

Examples of the silicon compound can include, for example:

$HSiCl_3$, $H_2SiCl_2$, $H_3SiCl$, $HCH_3SiCl_2$, $HC_2H_5SiCl_2$, $H(t-C_4H_9)SiCl_2$, $HC_6H_5SiCl_2$, $H(CH_3)_2SiCl$, $H(i-C_3H_7)_2SiCl$, $H_2C_2H_5SiCl$, $H_2(n-C_4H_9)SiCl$, $H_2(C_6H_4CH_3)SiCl$, $HSi(CH_3)_3$, $HSiCH_3(OCH_3)_2$, $HSiCH_3(OC_2H_5)_2$, $HSi(OCH_3)_3$, $(C_2H_5)_2SiH_2$, $HSi(CH_3)_2(OC_2H_5)$, $HSi(CH_3)_2[N(CH_3)_2]$, $HSiCH_3(C_2H_5)_2$, $HSiC_2H_5(OC_2H_5)_2$, $HSiCH_3[N(CH_3)_2]_2$, $C_6H_5SiH_3$, $HSi(C_2H_5)_3$, $HSi(OC_2H_5)_3$, $HSi(CH_3)_2[N(C_2H_5)_2]$, $HSi[N(CH_3)_2]_3$, $C_6H_5CH_3SiH_2$, $C_6H_5(CH_3)_2SiH$, $(n-C_3H_7)_3SiH$, $HSiCl(C_6H_5)_2$, $H_2Si(C_6H_5)_2$, $HSi(C_6H_5)_2CH_3$, $(n-C_5H_{11}O)_3SiH$, $HSi(C_6H_3)_3$, $(n-C_5H_{11})_3SiH$ as well as those compounds not contained in the above-mentioned general formula, for example: $(ClCH_2CH_2O)_2CH_3SiH$, $HSi(OCH_2CH_2Cl)_3$, $[H(CH_3)_2Si]_2O$, $[H(CH_3)_2Si]_2NH$, $(CH_3)_3SiOSi(CH_3)_2H$, $[H(CH_3)_2Si]_2C_6H_4$, $[H(CH_3)_2SiO]_2Si(CH_3)_2$, $[(CH_3)_3SiO]_2SiHCH_3$, $[(CH_3)_3SiO]_3SiH$,

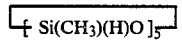

Among them, those halogenated silicon compounds, in which R is a hydrocarbon, n is a number from 0 to 2 and r is a number from 1 to 3 in the above-mentioned general formula, that is, $HSiCl_3$, $H_2SiCl_2$, $H_3SiCl$, $HCH_3SiCl_2$, $HC_2H_5SiCl_2$, $H(t-C_4H_9)SiCl_2$, $HC_6H_5SiCl_2$, $H(CH_3)_2SiCl$, $H(i-C_3H_7)_2SiCl$, $H_2(C_2H_5)SiCl$, $H_2(n-C_4H_9)SiCl$, $H_2(C_6H_4CH_3)SiCl$, $HSiCl(C_6H_5)_2$ are desirable, $HSiCl_3$, $HCH_3SiCl_2$ and $H(CH_3)_2SiCl$, and the like being particularly preferred and $HSiCl_3$ is especially preferred.

(C) Titanium Halide Compound

As the titanium halide compound, titanium tetrachloride, trichloroethoxy titanium, dichlorodibutoxy titanium, dichlorodiphenoxy titanium, and the like are illustrative. Titanium tetrachloride is particularly desirable.

(D) Electron Donating Compound

The electron donating compound can include, for example, carboxylic acids, carboxylic anhydrides, carboxylic acid esters, carboxylic acid halides, alcohols, ethers, ketones, amines, amides, nitriles, aldehydes, alcoholates, phosphorus, arsenic and antimony compounds bonded with organic groups by way of carbon or oxygen, phosphamides, thioethers, thioesters and carbonic acid esters. Among them, carboxylic acids, carboxylic acid anhydrides, carboxylic acid esters, carboxylic acid halides, alcohols and ethers are preferably used.

Specific examples of the carboxylic acid can include aliphatic monocarboxylic acid such as formic acid, acetic acid, propionic acid, butyric acid, isobutyric acid, valeric acid, capronic acid, pivalic acid, acrylic acid, methacrylic acid and crotonic acid; aliphatic dicarboxylic acid such as malonic acid, succinic acid, glutaric acid, adipic acid, sebacic acid, maleic acid and fumaric acid; aliphatic oxycarboxylic acid such as tartaric acid; cycloaliphatic carboxylic acid such as cyclohexane monocarboxylic acid, cyclohexene monocarboxylic acid, cis-1,2-cyclohexane dicarboxylic acid, cis-4-methylcyclohexene-1,2-dicarboxylic acid; aromatic monocarboxylic acid such as benzoic acid, toluic acid, anisic acid, p-tertiary butyl benzoic acid, naphthoic acid and cinnamic acid; aromatic polycarboxylic acid such as phthalic acid, isophthalic acid, terephthalic acid, naphthalic acid, trimellitic acid, hemimellitic acid, trimesic acid, pyromellitic acid and mellitic acid.

As the carboxylic acid anhydrides, anhydrides of the above-mentioned carboxylic acids can be used.

As the carboxylic acid ester, mono or poly esters of the above-mentioned carboxylic acids can be used and specific examples thereof can include butyl formate, ethyl formate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, ethyl cyclohexyl carboxylate, methyl benzoate, ethyl benzoate, methyl p-toluylate, ethyl p-tertiary butyl benzoate, ethyl p-anisate, ethyl α-naphthoate, isobutyl α-naphthoate, ethyl cinnamate, monomethyl phthalate, monobutyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate, dibutyl naphthalate, triethyl trimellate, tributyl trimellate, tetramethyl pyromellate, tetraethyl pyromellate, and tetrabutyl pyromellate.

As the carboxylic acid halides, acid halides of the carboxylic acids as described above can be used and the specific examples thereof can include acetic chloride, acetic bromide, acetic iodide, propionic chloride, butyric chloride, butyric bromide, butyric iodide, pivalic chloride, pivalic bromide, acrylic chloride, acrylic bromide, acrylic iodide, methacrylic chloride, methacrylic bromide, methacrylic iodide, crotonic chloride, malonic chloride, malonic bromide, succinic chloride, succinic bromide, glutaric chloride, glutaric bromide, adipic chloride, adipic bromide, sebacic chloride, sebacic bromide, maleic chloride, maleic bromide, fumaric chloride, fumaric bromide, tartaric chloride, tartaric bromide, cyclohexane carboxylic chloride, cyclohexane carboxylic bromide, 1-cyclohexene carboxylic chloride, cis-4-methylcyclohexene carboxylic chloride, cis-4-methyl-cyclohexane carboxylic bromide, benzoyl chloride, benzoyl bromide, p-toluiric chloride, p-toluiric bromide, p-anisic chloride, p-anisic bromide, α-naphthoic chloride, cinnamic chloride, cinnamic bromide, phthalic dichloride, phthalic dibromide, isophthalic dichloride, isophthalic dibromide, terephthalic dichloride and naphthalic dichloride. Further, monoalkyl halides of dicarboxylic acids such as adipic monomethyl chloride, maleic monoethyl chloride, maleic monomethyl chloride and phthalic butyl chloride can also be used.

The alcohols are represented by the general formula ROH. In the formula, R represents alkyl, alkenyl, cycloalkyl, aryl and aralky with 1 to 12 carbon atoms. The specific examples are methanol, ethanol, propanol, isopropanol, butanol, isobutanol, pentanol, hexanol, octanol, 2-ethylhexanol, cyclohexanol, benzyl alcohol, allyl alcohol, phenol, cresol, xylenol, ethyl phenol, isopropyl phenol, p-tertiarybutyl phenol and n-octyl phenol. The ethers are represented by the general formula ROR'. In the formula, R and R' represent alkyl, alkenyl, cycloalkyl, aryl and aralkyl of 1 to 12 carbon atoms, in which R and R' may be identical or different from each other. Specific examples are diethyl ether, diisopropyl ether, dibutyl ether, diisobutyl ether, diisoamyl ether, di-2-ethylhexyl ether, diallyl ether, ethyl allyl ether, butyl allyl ether, diphenyl ether, anisole and ethyl phenyl ether.

PREPARATION METHOD FOR THE CATALYST INGREDIENT

Figure 1:
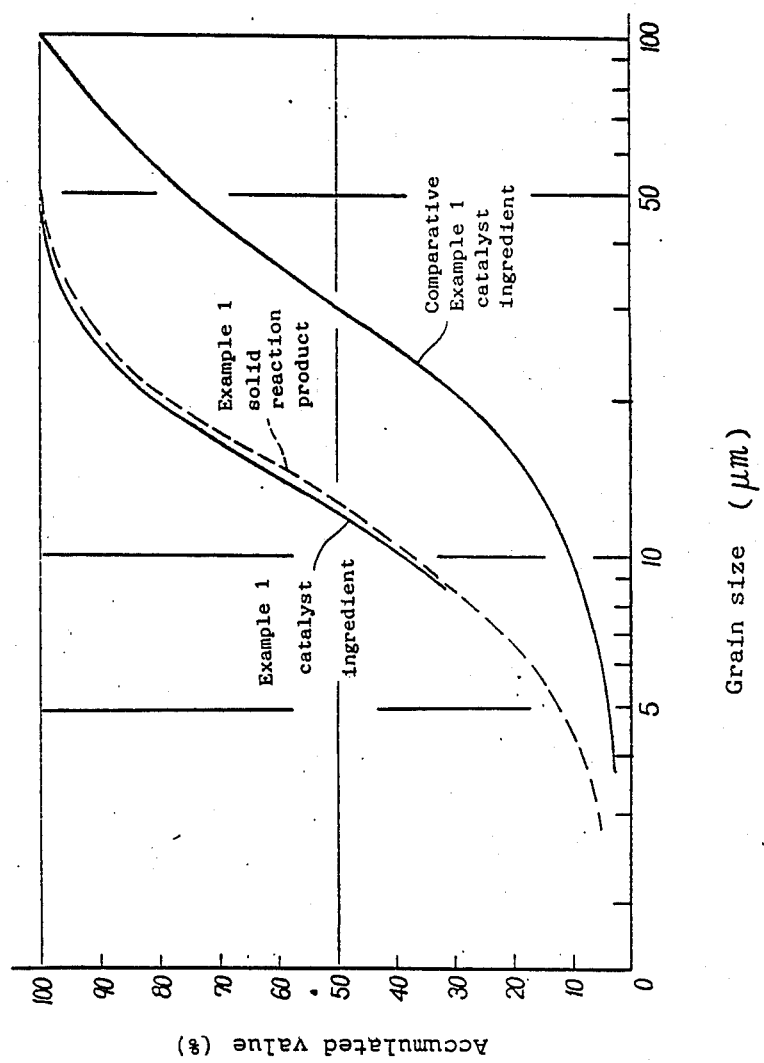
FIG. 1 is a drawing showing the grain size distribution of the catalyst ingredient prepared in accordance with the invention versus catalyst grain size obtained by altering the contacting sequence of TiCl₄ and the electron donor with the contact product of the magnesium dialkoxide and the silicon compound.

This invention concerns a process for producing the catalyst ingredient which comprises contacting a magnesium dialkoxide with a silicon compound having hydrogen-silicon bonds, contacting the thus obtained solid product with a titanium halide compound and then contacting them with an electron donating compound. Description will now be made of the production process.

CONTACT OF MAGNESIUM ALKOXIDE (INGREDIENT A) WITH SILICON COMPOUND HAVING HYDROGEN-SILICON BONDS (INGREDIENT B)

The ingredient A and the ingredient B are brought into contact in the presence of hydrocarbon medium, desirably, by mixing under stirring and especially by ball milling.

The hydrocarbon medium (hereinafter referred to as medium) is desirably saturated aliphatic, saturated cycloaliphatic or aromatic hydrocarbons of 6 to 12 carbon atoms such as hexane, heptane, octane, cyclohexane, benzene, toluene and xylene.

The ratio of contacting the ingredient A with the ingredient B is from 0.1 to 10 mol and, desirably, from 0.5 to 5 mol of the ingredient B per mol of the ingredient A. Both of them are brought into contact usually at −20 to about 200° C. for 0.1 to 100 hours. The ingredient A or the ingredient B may be used not only alone but also by two or more of them.

While the amount of the hydrocarbon medium used is optional, less than 100 ml of hydrocarbon medium based on 1 g of the ingredient A is desirable.

The solid product obtained through the contact of the ingredient A and the ingredient B (hereinafter referred to as contact product 1) is separated from the reaction system and then brought into contact with a titanium halide compound. Prior to the contact, the contact product 1 may be washed with the medium used for the reaction between the ingredient A and the ingredient B. The washing may be carried out under heating.

CONTACT WITH THE TITANIUM HALIDE COMPOUND (INGREDIENT C)

The contact product 1 and the ingredient C are brought into contact in the presence or absence of the hydrocarbon medium. The hydrocarbon medium is selected from the mediums used for the contact between the ingredient A and the ingredient B. A preferred method of contact is one such as mixing to agitate the ingredient A and the ingredient B in the presence or absence of the medium.

The ratio of contacting the contact product 1 and the ingredient C is 0.1 g mol and greater and, preferably, from 1 to 50 g mol of the ingredient C per 1 g atom of magnesium in the contact product 1.

The contact is carried out at −20 to about 200° C. for 30 seconds to 20 hours and, preferably, at 0 to 180° C. for 5 minutes to 10 hours; and, more preferably, at 60° to 150° C.

CONTACT WITH THE ELECTRON DONATING COMPOUND (INGREDIENT D)

The contact product from the contact product 1 and the ingredient C is then brought into contact with the ingredient D. The contact with the ingredient D is effected by adding the ingredient D to the reaction system in which the contact product 1 has been brought into contact with the ingredient C and then continuing the reaction further. Gradual addition of the ingredient D to the reaction system is favorable since this provides a better result. The ingredient D may be added with an appropriate solvent, for example, as a solution dissolved into the above-mentioned medium.

The contact with the ingredient D is effected at −20 to about 200° C. for 0.1 to 20 hours and, preferably, at 0° to 150° C. for 0.5 to 5 hours. The ingredient D is desirably used in an amount within the range from 0.005 to 10 g mol and, particularly, from 0.01 to 2 g mol per one g atom of the magnesium in the contact product 1.

While the catalyst ingredient according to this invention as a solid product (hereinafter referred to as contact product 2) can be prepared as described above, the contact product 2 may further be brought into contact one or more times with the titanium halide compound (ingredient C). The contact product 2 may be washed with an appropriate cleaning agent; for example, the above-mentioned medium under room temperature or under heating prior to contact with the ingredient C.

The method of contacting the contact product 2 with the ingredient C may be the same as in the contact of the contact product 1 with the ingredient C. Further, the conditions for the contact are as below. The ratio of contacting the contact product 2 with the ingredient C is more than 0.1 g mol and, preferably, from 1 to 50 g mol of the ingredient C per one g atom of magnesium in the contact product 2. The contact is carried out at −20 to about 200° C. for 30 sec. to 20 hours and, preferably, at 60° to 150° C. for 0.5 to 10 hours.

Further, when brought into contact with the ingredient C, the contact product 2 may be brought into contact with an inert hydrocarbon, halogenated hydrocarbon or halogenated metal compound (hereinafter they are referred to as the ingredient E) before and after the contact with the ingredient C (in the case where the contact product 2 is brought into contact with the ingredient C two or more times, it also includes contact in the course of and/or after each contact with the ingredient C). The substance to be contacted may be washed with the cleaning agent as described above prior to the contact with the ingredient E.

The inert hydrocarbons usable herein are aliphtic, cycloaliphatic and aromatic hydrocarbons. They can include, for example, n-hexane, methylhexane, dimethylhexane, ethylhexane, ethylmethylpentane, n-heptane, methylheptane, trimethylpentane, dimethylheptane, ethylheptane, trimethylhexane, trimethylheptane, n-octane, methyloctane, dimethyloctane, n-undecane, n-dodecane, n-tridecane, n-tetradecane, n-pentadecane, n-hexadecane, n-octadecane, n-nonadecane, n-eicosane, cyclopentane, cyclohexane, methylcylopentane, cycloheptane, dimethylcyclopentane, methylcyclohexane, ethylcyclopentane, dimethylcyclohexane, ethylcyclohexane, cyclooctane, indane, n-butylcyclohexane, isobutylcyclohexane, adamantane, benzene, toluene, xylene, ethylbenzene, tetramethylbenzene, n-butylbenzene, isobutylbenzene, propyltoluene, dacalin, tetralin, and the like.

The halogenated hydrocarbon usable herein are mono- and poly-halogen substitutes of saturated or unsaturated aliphatic, cycloaliphatic and aromatic hydrocarbons of 1 to 12 carbon atoms. Specific examples of these compounds can include aliphatic compounds such as methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethylbromide, ethyl iodide, 1,2-dichloroethane, 1,2-dibromoethane, 1,2-diiodoethane, methylchloroform, methylbromoform, methyliodoform, 1,1,2-trichloroethylene, 1,1,2-tribromoethylene, 1,1,2,2-tetrachloroethylene, pentachloroethane, hexachloroethane, hexabromoethane, n-propylchloride, 1,2-dichloropropane, hexabromoethane, octachloropropane, decabromobutane and chlorinated paraffin; cycloaliphatic compounds such as chlorocyclopropane, tetrechlorocyclopentane, hexachloropentadiene and hexachlorocyclohexane; and aromatic compounds such as chlorobenzene, bromobenzene, o-dichlorobenzene, p-dichlorobenzene, hexachlorobenzene, hexabromobenzene, benzotrichloride and p-chlorobenzotrichloride. These compounds may be used individually or mixtures thereof.

As the halogenated metal compound, halogenated products of elements selected from the group of elements belonging to Groups IIIa, IVa and Va of the elemental periodical table (hereinafter referred to as metal halides) such as chloride, fluoride, bromide and iodide of B, Al, Ga, In, Tl, Si, Ge, Sn, Pb, As, Sb and Bi. Particularly preferred are $BCl_3$, $BBr_3$, $BI_3$, $AlCl_3$, $AlBr_3$, $AlI_3$, $GaCl_3$, $GaBr_3$, $InCl_3$, $TlCl_3$, $SiCl_4$, $SnCl_4$, $SbCl_5$ and $SbF_5$.

The contact with the ingredient E effected optionally is carried out at 0 to about 200° C. for 5 minutes to 20 hours and, preferably, at 15° to 150° C. for from 10 minutes to 5 hours. In the case where the ingredient E is a liquid substance, it is desired that the product to be contacted is used in an amount from 1 to 1000 g per liter of the ingredient E, whereas in the case where the ingredient E is a solid substance, it is desired that the solid ingredient E is dissolved in the ingredient E capable of dissolving the same and the amount used is, preferably, from 0.01 to 100 g of the substance to be contacted per 1 g of the ingredient E.

Further, in the case where the contacted product 2 is not brought into contact with the ingredient C, the contacted product 2 may also be brought into contact with the ingredient E in the same manner as described above.

While the catalyst ingredient can be prepared as described above, the catalyst ingredient may be washed with the above-mentioned medium as required and further be dried as required.

The catalyst ingredient has a specific surface area of from 10 to 1000 $m^2/g$ as measured in the absorption temperature of liquid nitrogen according to the BET method and a pore volume of from 0.05 to 5 $cm^3/g$, contains less coarse particles and has uniform grain size with narrow grain size distribution. Desirably, the grain size is in the range of about 5 microns to about 50 microns, the 10 percentile of about 4 microns, the 30 percentile of about 8.8 microns, the 50 percentile of about 13 microns and the 90 percentile of about 29 microns. Further, it has a composition comprising from 10 to 23 percent by weight of magnesium, from 1 to 7 percent by weight of titanium, from 1 to 20 percent by weight of electron donating compound, from 35 to 65 percent by weight of chlorine and from 0.1 to 10 percent by weight of silicon.

OLEFIN POLYMERIZATION CATALYST

The catalyst ingredient as described above is combined with an organic compound of a metal belonging to Group I–III of the periodic table into a catalyst for use in the homopolymerization of an olefin or copolymerization with other olefins.

ORGANIC COMPOUND OF GROUP I - III METALS

As the organic metal compound, those organic compounds of lithium, magnesium calcium, zinc and aluminum can be used. Among them, organic aluminum compounds are particularly preferred. The organic aluminum compounds usable herein are those represented by the general formula $R_nAlX_{3-n}$ (where R represents alkyl group or aryl groups, X represents halogen atom, alkoxy group or hydrogen atom and n represents any number within a range: $1 \leq n \leq 3$). Particularly preferred are alkyl aluminum compounds of from 1 to 18 and preferably, from 2 to 6 carbon atoms such as trialkyl aluminum, dialkyl aluminum monohalide, monoalkyl aluminum dihalide, alkyl aluminum sesquihalide, dialkyl aluminum monoalkoxide and dialkyl aluminum monohydride, or mixtures or complex compounds thereof. Specifically, they can include trialkyl aluminum such as trimethyl aluminum, triethyl aluminum, tripropyl aluminum, triisobutyl aluminum and trihexyl aluminum; dialkyl aluminum monohalide such as dimethyl aluminum chloride, diethyl aluminum chloride, diethyl aluminum bromide, diethyl aluminum iodide and diisobutyl aluminum chloride; monoalkyl aluminum dihalide such as methyl aluminum dichloride, ethyl aluminum dichloride, methyl aluminum dibromide, ethyl aluminum dibromide, ethyl aluminum diiodide and isobutyl aluminum dichloride; alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, diisobutyl aluminum ethoxide and diisobutyl aluminum phenoxide; and dialkyl aluminum hydride such as dimethyl aluminum hydride, diethyl aluminum hydride, dipropyl aluminum hydride and diisobutyl aluminum hydride. Among them, trialkyl aluminum and, particularly, triethyl aluminum and triisobutyl aluminum are preferred. Further, these trialkyl aluminum can be used together with other organic aluminum compounds, for example, diethyl aluminum chloride, ethyl aluminum dichloride, ethyl aluminum sesquichloride, diethyl aluminum ethoxide, diethyl aluminum hydride or the mixtures or complex compounds thereof which are easily available industrially.

Further, those organic aluminum compounds in which two or more aluminum atoms are bonded by way of oxygen atom or nitrogen atom may also be used. Examples of such compounds can include, for example, $(C_2H_5)_2AlOAl(C_2H_5)_2$, $(C_4H_9)_2AlOAl(C_4H_9)_2$, $(C_2H_5)_2AlN(C_2H_5)Al(C_2H_5)_2$, and the like.

Organic compounds of metals other than aluminum metal can include those compounds such as $LiAl(C_2H_5)_4$, $LiAl(C_7H_{15})_4$ in addition to diethyl magnesium, ethyl magnesium chloride and diethyl zinc. Furthermore, the organic metal compounds may be used alone or in combination with the electron donating compound.

The electron donating compound usable herein can include those electron donating compounds comprising organic silicon compounds and those electron donating compounds containing hetero atoms such as nitrogen, sulfur, oxygen and phosphor in addition to the ingredient D as described above used upon producing the catalyst ingredient in this invention.

Specific examples of the organic silicon compound can include, for example, tetramethoxysilane, tetraethoxysilane, tetrabutoxysilane, tetraisobutoxysilane, tetraphenoxysilane, tetra(p-methylphenoxy)silane, tetrabenzyloxysilane, methyltrimethoxysilane, methyltriethoxysilane, methyltributoxysilane, methyltriphenoxysilane, ethyltriethoxysilane, ethyltriisobutoxysilane, ethyltriphenoxysilane, butyltrimethoxysilane, butyltriethoxisilane, butyltributoxisilane, butyltriphenoxysilane, isobutytriisobutoxysilane, vinyltriethoxysilane, allyltrimethoxysilane, phenyltrimethoxysilane, phenyltriethoxysilane, benzyltriphenoxysilane, methyltriallyloxysilane, dimethyldimethoxysilane, dimethyldiethoxysilane, dimethyldiisopropoxysilane, dimethyldibutoxysilane, dimethyldihexyloxysilane, dimethyldiphenoxysilane, diethyldiethoxysilane, diethyldiisobutoxysilane, diethyldiphenoxysilane, dibutyldiisopropoxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diallyldipropoxysilane, diphenyldiallyloxysilane, methylphenyldimethoxysilane and chlorophenyldiethoxysilane.

Specific examples of the electron donating compounds containing hetero atoms can include, for example, compounds containing nitrogen atoms, for example, 2,2,6,6-tetramethylpiperidine, 2,6-dimethylpiperidine, 2,6-diethylpiperidine, 2,6-diisopropylpiperidine, 2,6-diisobutyl-4-methylpiperidine, 1,2,2,6,6-pentamethylpiperidine, 2,2,5,5-tetramethylpyrrolidine, 2,5-dimethylpyrrolidine, 2,5-diethylpyrrolidine, 2,5-diisopropylpyrrolidine, 1,2,2,5,5-pentamethylpyrrolidine, 2,2,5-trimethylpyrrolidine, 2-methylpyridine, 3-methylpyridine, 4-methylpyridine, 2,6-diisopropylpyridine, 2,6-diisobutylpyridine, 1,2,4-trimethylpiperidine, 2,5-dimethylpiperidine, methyl nicotinate, ethyl nicotinate, niconitic amide, benzoic amide, 2-methylpyrrole, 2,5-dimethylpyrrole, imidazole, toluic amide, benzonitrile, acetonitrile aniline, p-toluidine, o-toluidine, m-toluidine, triethylamine, diethylamine, dibutylamine, tetramethylenediamine and tributylamine; compounds containing sulfur atoms such as thiophenol, thiophene, ethyl 2-thiophene carboxylate, ethyl 3-thiophene carboxylate, 2-methylthiopnen, methyl mercaptan, ethyl mercaptan, isopropyl mercaptan, butyl mercaptan, diethyl thioether, diphenyl thioether, methyl benzene sulfonate, methyl sulphite and ethyl sulphite; compounds containing oxygen atom such as tetrahydrofuran, 3-methyltetrahydrofuran, 2-methyltetrahydrofuran, 2-ethyltetrahydrofran, 2,2,5,5-tetraethyltetrahydrofuran, 2,2,5,5-tetramethyltetrahydrofuran, 2,2,6,6-tetraethyltetrahydropyran, 2,2,6,6-tetrahydropyran, dioxane, dimethyl ether, diethyl ether, dibutyl ether, diisoamyl ether, diphenyl ether, anisole, acetophenone, acetone, methyl ethyl ketone, acetyl acetone, o-tolyl-t-butyl ketone, methyl-2-6-di-t-butylphenyl ketone, ethyl 2-furalate, isoamyl 2-furalate, methyl 2-furalate and propyl 2-furalate and compounds containing phosphor atoms such as triphenyl phosphine, tributyl phosphine, triphenyl phosphite, tribenzyl phosphite, diethyl phosphate and diphenyl phosphate.

The catalyst ingredient obtained by the process according to this invention exhibits excellent catalytic performance when combined with the above-mentioned electron donating compound and, particularly, with the electron donating compound comprising the organic silicon compounds.

These electron donating compounds may be used by two or more of them. Further, the electron donating compound may be used when the organic metal compound is used in combination with the catalyst ingredient and also be used after brought in contact previously with the organic metal compound.

The amount of the organic metal compound used based on the catalyst ingredient is usually from 1 to 2000 g mol and, particularly, from 20 to 500 g mol per one g of titanium in the catalyst ingredient.

Further, the ratio between the organic metal compound and electron donating compound is selected within a range from 0.1 to 40 and, preferably, from 1 to 25 g atoms of the organic metal compound as aluminum based on one mol of the electron donating compound.

OLEFIN POLYMERIZATION

The catalyst comprising the catalyst ingredient obtained as described above and the organic metal compound (and electron donating compound) is useful as a catalyst for the homopolymerization of monoolefins of 2 to 10 carbon atoms or for the copolymerization with other monoolefin or diolefin of from 3 to 10 carbon atoms. It exhibits particularly excellent performance as the catalyst for use in the homopolymerization of α-olefins, particularly, α-olefins of 3 to 6 carbon atoms; for example, propylene, 1-butene, 4-methyl-1-pentene and 1-hexene, or for use in the random and block copolymerization of the above-mentioned olefins to each other and/or with ethylene.

The polymerizing reaction may be carried out either in a gas phase or liquid phase. In the liquid phase polymerization, it can be carried out in an inert hydrocarbon such as normal butane, isobutane, normal pentane, isopentane, hexane, heptane, octane, cyclohexane, benzene, toluene and xylene, as well as in a liquid monomer. The polymerization temperature lies within a range usually from −80° C. to +150° C. and, preferably, from 40 to 120° C. The pressure for the polymerization may be for example, from 1 to 60 atm. Further, the molecular weight of the thus obtained polymer is controlled by causing hydrogen or like other known molecular weight controller to be present. Further, the amount of other olefin to be copolymerized with the olefin in the copolymerization is selected within a range usually up to 30 percent by weight and, particularly, from 0.3 to 15 percent by weight based on the olefin. The polymerizing reaction with the catalyst system according to this invention may be carried out in either continuous or batchwise reaction and usually employed conditions may be used therefor. Further, the copolymerizing reaction may be carried at one step or two or more steps.

EFFECT OF THE INVENTION

The catalyst ingredient according to this invention is effective as the catalyst ingredient in the case of producing polyolefin, particularly, isotactic polypropylene, random copolymer of ethylene and propylene and block copolymer of ethylene and propylene.

The polymerization catalyst using the catalyst ingredient according to this invention has high polymerizing activity and steric-regularity, can maintain the high polymerizing activity for a long period of time during polymerization, as well as the olefin polymer powder thus obtained contains less macro-particles, is uniform in the particle size and enriched in the flowability.

EXAMPLE

This invention will now be described specifically referring to examples and application examples, but the invention is in no way restricted only to the examples. Percentage "%" shown in the examples and the application examples are based on weight unless otherwise specified.

The heptane insoluble matter showing the ratio of crystalline polymer in the polymer (hereinafter simply referred to as HI) is the residual amount when extracting with boiling n-heptane for 6 hours by using a modified type Soxhlet extractor. The melt flow rate (MFR) was measured according to ASTM-D 1238. Further, the bulk density was measured according to ASTM-D 1895-69 method A.

EXAMPLE 1

Contact of Magnesium Diethoxide with Trichlorosilane

Commercially available magnesium diethoxide (granular products manufactured by Dynamit Nobel Co.) was charged in an amount of 170 g into a stainless steel (SUS 316) mill pot of 1.2 liter inner volume containing 400 balls made of stainless steel (SUS 316) each of 12 mm diameter under a nitrogen gas atmosphere. After setting the mill pot to a vibrator, they were brought into contact at a vibration amplitude of 10 mm and a rotation of 1420 rpm for 2 hours to obtain pulverizates (I).

A 200 ml of glass reactor equipped with a reflux condenser, a dropping funnel and an agitator was sufficiently replaced with nitrogen gas. After charging 8.3 g of the pulverizates (I) (72.8 mmol) and 42 ml of n-heptane to the reactor, a mixed solution of 14.9 g (110.4 mmol, 1.5 molar times to magnesium diethoxide) of trichlorosilane and 30 ml of n-heptane was dropped through the dropping funnel for 30 minutes while stirring under room temperature and then stirring was further effected at 65° C. for 4 hours. In the course of the agitation, ethylene and ethylene chloride gases were mainly evolved from the reaction system. The thus obtained solids are filtered out at 65° C. and, after washing them while contacting under stirring with n-heptane at room temperature for twice each time with 100 ml and with toluene at room temperature for three times each time with 100 ml over 10 minutes, a toluene slurry of solid reaction product (I) was obtained.

A portion of the slurry was collected and the grain size distribution of the solid reaction product (I) was measured by using a laser beam deflection type grain size distribution instrument (Model 3600E) made by Marburn Co. (England) (refer to FIG. 1).

Further, the solid reaction products (I) contained 15.8 percent of magnesium, 10.2 percent silicon adn 45.5 percent of chlorine.

CONTACT OF TITANIUM TETRACHLORIDE AND DI-N-BUTYL PHTHALATE 51 ml of $TiCl_4$ was added to a toluene slurry comprising 8.5 g of solid reaction products (I) and 26 ml of toluene and the internal temperature was increased to 80° C. for 20 minutes. After increasing the temperature, a mixed solution of 1.7 g of di-n-butyl phthalate and 8 ml of toluene was added dropwise for 15 minutes using a dropping funnel. Then, the temperature of the solution was further increased to 115° C. and stirring was effected at that temperature for 2 hours. After removing the supernatant liquid by decantation, washing was conducted twice at a temperature of 90° C. for 10 minutes by using 100 ml of toluene, then, additional 21 ml of toluene and 51 ml of $TiCl_4$ were added and stirred at 115° C. for 2 hours.

The thus obtained solid substance was filtered out at 115° C. and washed with 100 ml of n-heptane at room temperature for 8 times to obtain a heptane slurry containing the catalyst ingredient according to this invention.

A portion of the slurry was collected and the grain size distribution of the catalyst ingredient was measured by using the device as described above (refer to FIG. 1).

As apparent from FIG. 1, no coarse particles were formed by the treatment with $TiCl_4$ and ester.

Further, the catalyst ingredient contained 2.2 percent of titanium, 18.2 percent of magnesium, 3.8 percent of silicon, 58.2 percent of chlorine and 12.5 percent of di-n-butyl phthalate and had a specific surface area of 255 $m^2/g$ and a pore volume of 0.15 $cm^3/g$.

EXAMPLES 2, 3

A catalyst ingredient with the titanium content as shown in Table 1 was prepared under the same conditions as those in Example 1 except for changing the temperature to 60° C. (in Example 2) and 100° C. (in Example 3) for the temperature in the reactor when dropping the ester in the course of contacting $TiCl_4$ and di-n-butyl phthalate as in Example 1.

EXAMPLE 4

A catalyst ingredient of 2.3 percent titanium content was prepared in the same procedures as in Example 1 except that instead of pulverizing commercially available magnesium ethoxide in the vibration type ball mill in Example 1, 70 g of magnesium ethoxide was charged under a nitrogen atmosphere in a mill pot made of stainless steel (SUS 316) of 600 ml inner volume containing 200 ball pieces made of stainless steel (SUS 316) each of 12 mm diameter, the mill pot was attached to a rotary support rack and rotational contact was effected at a number of rotation of 157 rpm for 20 hours to obtain pulverization product (II).

EXAMPLE 5, 6

A catalyst ingredient with the titanium content as shown in Table 1 was prepared under the same conditions as those in Example 1 except for using trichlorosilane in an amount of 2.5 molar times (Example 5) and 1.0 molar times (Example 6) to the magnesium diethoxide upon contacting magnesium diethoxide and trichloisilane in Example 1.

EXAMPLES 7-9

A catalyst ingredient with the titanium content as shown in Table 1 was prepared by the same procedures as those in Example 1 except for using methyldichlorosilane (Example 7), dimethylchlorosilane (Example 8) and triethysilane (Example 9) instead of trichlorosilane upon contacting magnesium diethoxide and trichlorsilane in Example 1.

EXAMPLES 10-15

A catalyst ingredient with the titanium content as shown in Table 1 was prepared in the same procedures as those in Example 1 except for using phthalic anhydride (Example 10), phthalic chloride (Example 11), diisobutyl phthalate (Example 12), ethyl benzoate (Example 13), benzoic acid (Example 14) and diisobutyl sebacate (Example 15) instead of di-n-butyl phthalate upon contacting $TiCl_4$ and di-n-butyl phthalate in Example 1.

EXAMPLE 16, 17

A catalyst ingredient with the titanium content as shown in Table 1 was prepared in the same procedures as those in Example 1 except for changing the dropping amount of di-n-butyl phthalate to 1.3 g (Example 16) and 2.4 g (Example 17) upon contacting $TiCl_4$ and di-n-butyl phthalate in Example 1.

EXAMPLE 18

A catalyst ingredient with the titanium content as shown in Table 1 was prepared by the same procedures as in Example 1 except for dropping 1.7 g of di-n-butyl phthalate instead of dropping a toluene solution of di-n-butyl phthalate upon contacting $TiCl_4$ and di-n-butyl phthalate in Example 1.

EXAMPLE 19

Solid reaction product (I) was prepared under the same conditions as in Example 1 except for washing with n-heptane instead of toluene. Further, a catalyst ingredient with the titanium content as shown in Table 1 was prepared by the same procedures in Example 1 except for adding 72 ml of $TiCl_4$ without using toluene to a heptane slurry comprising 8.5 g of the solid reaction product (I) and 13 ml of n-heptane upon contacting $TiCl_4$ and di-n-butyl phthalate and 72 ml of $TiCl_4$ were added with no addition of toluene also in the $TiCl_4$ treatment in the second $TiCl_4$ treatment.

EXAMPLE 20

A catalyst ingredient with the titanium content as shown in Table 1 was prepared by adding a toluene solution of di-n-butyl phthalate dropwise upon contacting $TiCl_4$ and di-n-butyl phthalate in Example 1 and, after stirring at 115° C. for 2 hours, filtering the thus obtained solid substance at 115° C. and washing the filtrate at a room temperature 8 times by n-heptane with 100 ml each time.

EXAMPLE 21

A toluene solution of di-n-butyl phthalate was added dropwise and stirred at 115° C. for 2 hours upon contacting $TiCl_4$ and di-n-butyl phthalate in Example 1. After removing the supernatant liquid by decantation, 90 ml of toluene and 8.4 g of hexachloroethane were added and brought into contact at 60° C. for one hour. After washing by toluene at 60° C. four times with 90 ml each time, 21 ml of toluene and 51 ml of $TiCl_4$ were additionally added and stirred at 115° C. for 2 hours.

A catalyst ingredient with the titanium content as shown in Table 1 was prepared by filtering the thus obtained solid substance at 115° C. and washed by n-heptane 8 times each with 100 ml of n-heptane.

EXAMPLE 22, 23

A catalyst ingredient with the titanium content as shown in Table 1 was prepared under the same conditions as those in Example 21 except for using 6.3 g of $SiCl_4$ (Example 22) and 4.9 g of $AlCl_3$ (Example 23) instead of hexachloroethane used in Example 21.

EXAMPLE 24

The heptane slurry containing 4.5 g of the catalyst ingredient obtained in Example 20 (containing 50 ml of heptane) was charged in a glass reactor attached with a stirrer under a nitrogen gas atmosphere and then stirring was effected at 50° C. for 30 minutes with addition of 4.2 g of hexachloroethane.

A catalyst ingredient with the titanium content as shown in Table 1 was prepared by filtering the thus obtained solid substance at 50° C. and washing the filtrate 5 times by n-heptane with 100 ml each time.

EXAMPLE 25, 26

A catalyst ingredient with the titanium content as shown in Table 1 was prepared by the same procedures as those in Example 1 except for using commercially available magnesium di-n-proxide (Example 25) and commercially available magnesium di-n-butoxide (Example 26), respectively, instead of magnesium diethoxide used in Example 1.

EXAMPLE 27

100 ml of toluene was added to the solid substance obtained by filtering at 115° C. in the same manner as in Example 20 and stirred at 90° C. for one hour. A catalyst ingredient with the titanium content as shown in Table 1 was prepared by filtering the solid substance at 90° C. and washing the filtrate 8 times by n-heptane with 100 ml each time at room temperature.

EXAMPLE 28

A catalyst ingredient with the titanium content as shown in Table 1 was prepared in the same procedures as in Example 1 except for changing the treating temperature at 115° C. after the dropping of di-n-butyl phthalate and after the addition of the second TiCl$_4$ in Example 1 into 123° C., respectively.

COMPARATIVE EXAMPLE 1

A toluene slurry of the solid reaction products (I) was obtained in the same manner as in Example 1.

1.7 g of di-n-butyl phthalate was added to a toluene slurry comprising 8.5 g of the solid reaction products (I) and 34 ml of toluene and stirred at 50° C. for 2 hours.

Then, 51 ml of TiCl$_4$ was added at that temperature and stirred at 115° C. for 2 hours. After removing the supernatant liquid by decantation, 21 ml of toluene and 51 ml of TiCl$_4$ were additionally added and again stirred at 115° C. for 2 hours.

A catalyst ingredient with 1.8 percent titanium content was obtained by filtering the thus obtained solide substance at 115° C. and washing the filtrate 8 times with n-heptane with 100 ml each time.

Further, the grain size distribution of the catalyst ingredient was measured by the same method as in Example 1 and the measuring results are shown in Table 1. As apparent from FIG. 1, coarse particles are formed by the treatment with di-n-butyl phthalate and TiCl$_4$.

COMPARATIVE EXAMPLE 2

A catalyst ingredient with 1.7 percent titanium content was obtained by the same procedures as those in Comparative Example 1 except the second contact with TiCl$_4$ was omitted.

COMPARATIVE EXAMPLE 3

A catalyst ingredient with 2.0 percent titanium content was prepared by the same procedures as those in Comparative Example 1 except for using n-heptane instead of toluene upon contacting di-n-butyl phthalate and TiCl$_4$ in Comparative Example 1.

COMPARATIVE EXAMPLE 4

A catalyst ingredient with 2.0 percent titanium content was prepared by the same procedures as those in Comparative Example 2 except for using n-heptane instead of toluene upon contacting di-n-butyl phthalate and TiCl$_4$ in Comparative Example 2.

COMPARATIVE EXAMPLE 5

Magnesium diethoxide and trichlorosilane were brought into contact under the same conditions as those in Example 1 and, after contact, they were washed 5 times with 100 ml of n-heptane each time and then further dried at a reduced pressure to obtain solid reaction products (IV).

15 g of the solid reaction products (IV) were charged under a nitrogen gas atmosphere in a stainless steel mill pot (SUS 316) of 300 ml of inner volume containing 100 stainless steel balls (SUS 316) each of 12 mm diameter, 2.6 g of di-n-butyl phthalate were then added and, after attaching the mill pot to a vibrator, vibration was applied for one hour to conduct contact to thereby obtain the solid ingredient (V).

A catalyst ingredient with 3.3 percent titanium content was prepared by bringing 10 g of the solid ingredient (V) into contact with TiCl$_4$ in the same manner as in Example 1.

APPLICATION EXAMPLE 1

Propylene Polymerization

A heptane slurry containing 10.2 mg of the catalyst ingredient obtained in Example 1, 3.7 ml of a n-heptane solution containing one mol of triethyl aluminum (hereinafter simply referred to as TEAL) in one liter of n-heptane corresponding to 150 g atoms of aluminum per one g of titanium in the catalyst ingredient and 2.10 ml of a heptane solution containing 0.05 mol/l of phenyl triethoxysilane corresponding to 0.10 g mol per one g atom of aluminum in the TEAL were mixed together and maintained for 5 minutes, which were charged under a nitrogen gas atmosphere into an autoclave made of stainless steel (SUS 32) of 1.5 liter inner volume equipped with a stirrer. Then, after supplying under pressure 300 ml of hydrogen gas for molecular weight control and 1 liter of liquefied propylene, the temperature of the reaction system was increased to 70° C. to conduct polymerization of propylene for one hour. After the completion of the polymerization, unreacted propylene was purged to obtain 259 g of white polypropylene powder Kc=25400 (polymer yield amount g per 1 g of the catalyst ingredient) Kt=1155 (polymer yield amount kg per 1 g of Ti in the catalyst ingredient) with 97.4 percent HI (heptane insoluble component indicating the ratio of the crystalline polymer in the polymer), 4.6 MFR (melt flow rate) and 0.37 g/cm$^3$ of bulk density.

The grain size distribution of the thus obtained polymer was measured by using a standard sieve according to W. S. Tylor Co. standard. The grain size distribution was as shown below.

| Grain size ($\mu$m) | Grain size distribution (%) |
| --- | --- |
| ~53 | 1.2 |
| 53~74 | 2.3 |
| 74~149 | 13.2 |
| 149~250 | 27.7 |
| 250~350 | 17.9 |
| 350~420 | 9.4 |
| 420~590 | 16.1 |
| 590~840 | 9.2 |
| 840~1000 | 1.2 |
| 1000~1680 | 1.4 |
| 1680~ | 0.4 |

APPLICATION EXAMPLES 2–33

Propylene was polymerized by the same procedures as those in Application Example 1 except for using the catalyst ingredient obtained in Examples 2–28 and Comparative Example 1–5 instead of the catalyst ingredient obtained in Example 1. The results are shown in Table 2.

TABLE 1

| EXAMPLE | TITANIUM CONTENT (%) | EXAMPLE | TITANIUM CONTENT (%) |
| --- | --- | --- | --- |
| 2 | 2.4 | 16 | 1.9 |
| 3 | 2.2 | 17 | 2.3 |
| 5 | 2.1 | 18 | 2.3 |
| 6 | 2.3 | 19 | 2.5 |
| 7 | 2.4 | 20 | 2.1 |
| 8 | 2.6 | 21 | 1.9 |
| 9 | 2.7 | 22 | 1.9 |
| 10 | 2.7 | 23 | 1.9 |

TABLE 1-continued

| EXAMPLE | TITANIUM CONTENT (%) | EXAMPLE | TITANIUM CONTENT (%) |
|---|---|---|---|
| 11 | 1.8 | 24 | 1.7 |
| 12 | 2.4 | 25 | 2.6 |
| 13 | 2.0 | 26 | 2.7 |
| 14 | 2.8 | 27 | 1.9 |
| 15 | 2.5 | 28 | 2.3 |

TABLE 2

| Application Example No. | Catalyst ingredient | Kc (g/g-catalyst) | Kt (kg/g-Ti) | HI (%) | Bulk density (g/cm$^3$) | MFR (g/10 min) | Average polymer grain size ($\mu$m) | >1000 $\mu$m polymer (%) |
|---|---|---|---|---|---|---|---|---|
| 1 | Example 1 | 25400 | 1155 | 97.4 | 0.37 | 4.6 | 280 | 1.8 |
| 2 | 2 | 25300 | 1054 | 97.5 | 0.36 | 6.2 | 350 | 3.2 |
| 3 | 3 | 25900 | 1177 | 97.7 | 0.37 | 5.8 | 350 | 2.0 |
| 4 | 4 | 24800 | 1078 | 97.3 | 0.34 | 3.6 | 220 | 7.1 |
| 5 | 5 | 23400 | 1114 | 97.3 | 0.36 | 4.5 | 320 | 1.0 |
| 6 | 6 | 21100 | 917 | 97.4 | 0.36 | 2.1 | 310 | 2.4 |
| 7 | 7 | 23500 | 979 | 97.2 | 0.35 | 4.8 | 350 | 4.1 |
| 8 | 8 | 22500 | 865 | 97.2 | 0.37 | 4.1 | 330 | 3.8 |
| 9 | 9 | 22300 | 826 | 97.2 | 0.34 | 6.3 | 330 | 3.8 |
| 10 | 10 | 22500 | 833 | 96.9 | 0.37 | 5.1 | 290 | 1.1 |
| 11 | 11 | 22800 | 1267 | 96.4 | 0.35 | 7.5 | 300 | 1.2 |
| 12 | 12 | 23500 | 979 | 97.3 | 0.37 | 5.0 | 320 | 2.1 |
| 13 | 13 | 21100 | 1055 | 96.1 | 0.36 | 9.4 | 290 | 2.5 |
| 14 | 14 | 21800 | 779 | 95.5 | 0.36 | 9.5 | 290 | 2.0 |
| 15 | 15 | 23100 | 924 | 96.4 | 0.34 | 8.9 | 330 | 4.2 |
| 16 | 16 | 24500 | 1289 | 97.4 | 0.36 | 4.1 | 350 | 3.5 |
| 17 | 17 | 23800 | 1035 | 97.6 | 0.37 | 3.8 | 340 | 3.1 |
| 18 | 18 | 24900 | 1083 | 97.4 | 0.37 | 5.0 | 350 | 2.1 |
| 19 | 19 | 23600 | 944 | 97.3 | 0.34 | 4.0 | 380 | 5.8 |
| 20 | Example 20 | 21500 | 1024 | 96.9 | 0.35 | 4.0 | 290 | 2.8 |
| 21 | 21 | 23500 | 1237 | 97.9 | 0.39 | 4.9 | 320 | 2.5 |
| 22 | 22 | 23000 | 1211 | 97.7 | 0.39 | 5.1 | 320 | 4.1 |
| 23 | 23 | 23800 | 1253 | 97.7 | 0.39 | 5.5 | 310 | 4.0 |
| 24 | 24 | 22800 | 1341 | 97.4 | 0.37 | 3.9 | 300 | 2.5 |
| 25 | 25 | 22900 | 880 | 97.7 | 0.36 | 4.5 | 300 | 4.8 |
| 26 | 26 | 23500 | 870 | 97.5 | 0.37 | 4.2 | 330 | 2.6 |
| 27 | 27 | 21300 | 1121 | 97.4 | 0.36 | 4.1 | 310 | 3.2 |
| 28 | 28 | 27600 | 1200 | 97.5 | 0.35 | 5.7 | 320 | 5.0 |
| 29 | Comparative Example 1 | 18400 | 1022 | 96.8 | 0.35 | 3.9 | 900 | 42 |
| 30 | 2 | 17600 | 1035 | 96.5 | 0.34 | 5.0 | 1010 | 55 |
| 31 | 3 | 17900 | 895 | 96.7 | 0.34 | 4.0 | 890 | 51 |
| 32 | 4 | 17300 | 865 | 96.5 | 0.34 | 6.2 | 990 | 56 |
| 33 | 5 | 18200 | 552 | 96.8 | 0.35 | 4.4 | 1100 | 60 |

What is claimed is:

1. A titanium containing catalyst component obtained by sequentially contacting
   A. the contact product obtained by contacting in a hydrocarbon medium a magnesium dihydrocarbyloxide with a silicon compound having a hydrogen-silicon bond,
   B. a halogenated titanium compound, and
   C. an electron donor.

2. The titanium containing catalyst component in accordance with claim 1 wherein the magnesium dihydrocarbyloxide is represented by the formula Mg(OR)(OR') wherein each R and R' can be the same or different is a $C_1$–$C_{20}$ alkyl group, the silicon compound is represented by the formula $H_mR_nSIX_r$ wherein R represents a hydrocarbon group, $R^1O$—, $R^2R^3N$— and $R^4COO$—, X represents a halogen atom, m is a number from 1 to 3, $0 \leq r \leq 3$, $m+n+r=4$, if $n>1$ each R may be the same or different; R, $R^1$, $R^2$, $R^3$ and $R^4$ are selected from alkyl, alkenyl, cylcoalkyl, aryl and aralkyl radicals having from 1 to 16 carbon atoms, the titanium compound is $TiCl_4$ and the electron donor compounds are selected from carboxylic acids, carboxylic acid anhydrides, carboxylic acid esters, and carboxylic acid halides.

3. The catalyst component in accordance with claim 2 wherein the silicon compound is trichlorosilane, the magnesium dihydrocarbyloxide is magnesium diethoxide and the electron donor is selected from di-n-butyl phthalate, phthalic anhydride, phthalic chloride, diisobutyl phthalate, ethyl benzoate, benzoic acid, and diisobutyl sebacate.

4. The catalyst component in accordance with claim 1 wherein the catalyst component is further contacted one or more times with $TiCl_4$.

5. A catalyst system comprising the catalyst component of claim 1 or 4 and an aluminum alkyl cocatalyst.

6. The catalyst system in accordance with claim 5 further comprising one or more electron donors.

* * * * *